United States Patent
Magdassi et al.

(10) Patent No.: US 7,115,161 B2
(45) Date of Patent: Oct. 3, 2006

(54) INK-JET INK COMPOSITIONS BASED ON OIL-IN-WATER MICROEMULSION FORMING NANOPARTICLES UPON APPLICATION ON A SURFACE

(75) Inventors: Shlomo Magdassi, Jerusalem (IL); Matti Ben-Moshe, Reut (IL)

(73) Assignee: Yissum Research Development Company of the Hebrew University of Jerusalem, Jerusalem (IL)

( * ) Notice: Subject to any disclaimer, the term of this patent is extended or adjusted under 35 U.S.C. 154(b) by 60 days.

(21) Appl. No.: 10/276,424

(22) PCT Filed: May 14, 2002

(86) PCT No.: PCT/IL01/00426

§ 371 (c)(1), (2), (4) Date: Mar. 25, 2003

(87) PCT Pub. No.: WO01/88046

PCT Pub. Date: Nov. 22, 2001

(65) Prior Publication Data

US 2003/0213402 A1  Nov. 20, 2003

(30) Foreign Application Priority Data

May 16, 2000  (IL)  ........................ 136185

(51) Int. Cl.
*C09D 11/02*  (2006.01)
(52) U.S. Cl. ................ 106/31.25; 106/31.27; 106/31.58; 106/31.59
(58) Field of Classification Search ............. 106/31.25, 106/31.27, 31.58, 31.59
See application file for complete search history.

(56) References Cited

U.S. PATENT DOCUMENTS

| 4,692,188 A | * | 9/1987 | Ober et al. ................. 523/300 |
| 5,047,084 A | | 9/1991 | Miller Robert J. et al. ....................... 106/31.25 |
| 5,226,957 A | | 7/1993 | Wickramanayake ..... 106/31.26 |

(Continued)

FOREIGN PATENT DOCUMENTS

EP  0 839 882 A  5/1998

(Continued)

OTHER PUBLICATIONS

"Patterning of Organic Nanoparticles by Ink-jet Printing of Microemulsions," Magdassi et al., Langmuir 2003, 19, pp. 939-942, no month available.

*Primary Examiner*—Helene Klemanski
(74) *Attorney, Agent, or Firm*—Browdy and Neimark, PLLC (57) ABSTRACT

An Ink-jet ink composition for piezoelectric in-jet printing comprising: (a) a hydrophobic dye; (b) an oil-in-water microemulsion including: (i) a volatile oil; (ii) water; (iii) a co-solvent; (iv) at least one surfactant; and (v) a binder, wherein upon application of the ink to a substrate surface, the volatile oil evaporates and nanoparticles are formed. The invention additionally discloses a printing process using the ink composition.

25 Claims, 1 Drawing Sheet

U.S. PATENT DOCUMENTS

| | | | |
|---|---|---|---|
| 5,342,440 A | 8/1994 | Wickramanayake | 106/31.43 |
| 5,492,559 A | 2/1996 | Oliver et al. | 106/31.25 |
| 5,531,816 A | 7/1996 | Wickramanayake | 106/31.78 |
| 5,551,973 A | 9/1996 | Oliver et al. | 106/31.25 |
| 5,565,022 A | 10/1996 | Wickramanayake | 106/31.25 |
| 5,643,357 A | 7/1997 | Breton et al. | 106/31.25 |
| 5,713,989 A | 2/1998 | Wickramanayake et al. | 106/31.6 |
| 5,746,815 A * | 5/1998 | Caputo | 106/31.25 |
| 5,749,952 A | 5/1998 | Tsang et al. | 106/31.64 |
| 5,853,465 A | 12/1998 | Tsang et al. | 106/31.25 |
| 6,342,094 B1 * | 1/2002 | Kabalnov | 106/31.25 |
| 6,716,277 B1 * | 4/2004 | Naruse et al. | 106/31.27 |
| 2002/0007762 A1 * | 1/2002 | Arakawa | 106/31.27 |
| 2002/0107301 A1 * | 8/2002 | Yamanouchi et al. | 523/160 |
| 2005/0155516 A1 * | 7/2005 | Hermansky | 106/31.25 |

FOREIGN PATENT DOCUMENTS

| | | |
|---|---|---|
| EP | 0 892 025 A | 1/1999 |
| EP | 1 122 287 A1 | 8/2001 |
| EP | 1 136 530 A2 | 9/2001 |
| EP | 1 149 879 A2 | 10/2001 |
| WO | WO 97 16497 A | 5/1997 |

* cited by examiner

FIGURE 1

INK-JET INK COMPOSITIONS BASED ON OIL-IN-WATER MICROEMULSION FORMING NANOPARTICLES UPON APPLICATION ON A SURFACE

FIELD OF THE INVENTION

The present invention relates to an oil-in-water microemulsion ink-jet ink composition. More specifically the present invention relates to an oil-in-water microemulsion ink composition, comprising a highly hydrophobic dye dissolved in a volatile oil phase, which forms nano-particles ("pigment like") upon application on a substrate surface. The ink-jet ink composition is suitable for drop on-demand technology particularly to piezoelectric ink-jet printing.

BACKGROUND OF THE INVENTION

Ink-jet printing is a non-impact printing process in which droplets of ink are deposited on print media, such as paper, transparency film, or textiles. Low cost and high quality of the output, combined with relatively noise-free operation, have made ink-jet printers a popular alternative to other types of printers used with computers. Essentially, ink-jet printing involves the ejection of fine droplets of ink onto print media in response to electrical signals generated by a microprocessor.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The other type of drop-on-demand system is known as thermal ink jet, or bubble jet. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again.

Ink-jet inks are mostly available as dye based compositions. The main disadvantage of dye compositions (wherein the dye is dissolved in a solvent) is their limited lightfastness which results in dye fading. A very limited number of pigment-based inks are also available. Perhaps the desirable property that pigments offer is their superior lightfastness. However, pigments have not found extensive use in ink-jet ink compositions partly due to their natural tendency to agglomerate in aqueous media. Pigment particles tend to agglomerate because their outer surfaces create natural forces of attraction between the particles. The agglomeration of pigment particles can lead to nozzle clogging and result in poor print quality, due to defects such as those deriving from print density and mottling, and poor reliability.

Microemulsion based ink-jet ink is one of many ink-jet ink formulations which have been suggested in the past 20 years.

Several advantages are achieved with microemulsion based ink-jet inks. Microemulsion inks are highly stable solutions composed of finely divided droplets (10–100 nm) and low viscosity. Oil-in-water microemulsion based inks may provide fast drying times and excellent waterfastness of the drying film. In addition good wetting properties may be achieved on hydrophobic/hydrophilic surfaces.

U.S. Pat. No. 5,047,084 discloses a thermal ink jet ink composition in the form of a microemulsion including an organic vehicle phase having a colorant dispersed therein and an aqueous phase containing a surfactant, the vehicle phase preferably being liquid at 70° C. and solid at 20° C.

U.S. Pat. No. 5,531,816 discloses a pigment-based ink-jet ink compositions by formulating the ink compositions to include at least one appropriately modified pigment in a water-insoluble organic compound, which is microemulsified with an amphiphile and water. According to the invention the pigment is deagglomerated by means of encapsulation with a polymer, dispersion with a dispersing agent and surface modification.

U.S. Pat. No. 5,713,989 discloses aqueous pigment dispersion-based ink-jet ink compositions formulating the ink compositions to comprise at least one aqueous pigment dispersion and a microemulsion comprising at least one water-insoluble organic compound, at least one hydrotropic amphiphile, and water. The hydrotropic amphiphile is present in the microemulsion in an amount sufficient to solubilize the water-insoluble organic compound.

U.S. Pat. No. 5,749,952 discloses a thermal ink-jet ink composition containing a vehicle and a colorant, the vehicle comprises a microemulsion containing at least one substantially water-insoluble organic oil, at least one organic co-solvent, water and optionally at least one amphiphile and at least one high molecular weight colloid. The colorant is a water-insoluble chromophore that has been chemically modified to be water-soluble by addition of functional groups that impart water solubility. The inks described demonstrate high edge acuity, high optical density, fast drying times, reduced bleed, improved halo characteristics, high water fastness, and high smearfastness.

U.S. Pat. No. 5,342,440 discloses water-insoluble black dyes formulated in a microemulsion based ink. A combination of thermal ink-jet inks which avoid bleed between black and color inks was described.

U.S. Pat. No. 5,853,465 discloses an ink-jet ink set comprising: (a) microemulsion-based black ink in which the colorant is a water-insoluble black pigment that has been chemically modified to impart water solubility by addition of functional groups to form a macromolecular chromophore and (b) at least one non-black (cyan, yellow, or magenta) ink that is a typical aqueous dye-based ink with an agent that increases the ionic strength of the non-black ink and comprises either an inorganic salt or an organic acid. The organic acid is used to adjust the pH of the non-black ink to a value of less than 5. The non-black ink may alternatively comprise a water-insoluble non-black pigment that has also been chemically modified. The macromolecular chromophore-containing ink, or pigment-based ink, of the ink-jet ink set is a microemulsion that contains substantially water-insoluble organic oil, an organic co-solvent, water, an amphiphile and optionally a high molecular weight colloid. By employing an ink set in which some of the members of the set have a higher ionic strength than the black ink microemulsion-based ink, bleed alleviation can be achieved.

U.S. Pat. No. 5,226,957 discloses water-insoluble dyes formulated in microemulsion-based ink for thermal ink-jet printers, which are waterfastness, are non-threading, and are bleed alleviated. The ink-jet inks have a formula comprising: (a) about 0.05 to 0.75 wt % of a high molecular weight colloid; (b) about 0.1 to 40 wt % of at least two surfactants, (c) about 0.5 to 20 wt % of at least one co-solvent; (d) about 0.1 to 5 wt % of at least one water-insoluble dye; (e) about 0.1 to 20 wt % of an oil; and (f) the balance water. This invention uses a non-volatile oil phase due to evaporation associated with application in thermal ink-jet printers.

U.S. Pat. No. 5,492,559 discloses a thermal ink-jet ink composition that comprises an aqueous phase, an oil phase, an oil-soluble dye, and a surfactant, said ink exhibiting a liquid crystalline gel phase at a first temperature and a liquid microemulsion phase at a second temperature higher than the first temperature.

U.S. Pat. No. 5,643,357 discloses a thermal ink-jet ink composition which comprises water, an oil-soluble or alcohol-soluble dye and a surfactant, said ink exhibiting a liquid microemulsion phase at a first temperature and, at a second temperature higher than the first temperature, separating into a mixture of an aqueous liquid phase and a liquid crystalline gel phase.

U.S. Pat. No. 5,551,973 discloses a thermal ink-jet ink composition which comprises an aqueous phase, an oil phase, a photochromic material, and a surfactant, said ink exhibiting a liquid crystalline gel phase at a first temperature and a liquid microemulsion phase at a second temperature higher than the first temperature.

European patent No. 892025 discloses an aqueous microemulsion-based ink-jet ink composition that employs a second organic solvent that is miscible with both the discontinuous and the continuous phase. Specifically, the ink-jet ink composition of the invention comprises at least one dye and a microemulsion comprising at least one high-boiling water-insoluble organic compound, a second high-boiling compound miscible with both aqueous and organic phases, at least one amphiphile, and water, wherein the amphiphile is present in an amount sufficient to solubilize the water-insoluble organic compound. However, since a high boiling organic solvent in included in the compositions disclosed, when the composition is applied on a print media, the water first evaporates and a continuous hydrophobic film is formed which might lead to dye fading and smearing.

None of these prior art patents disclosed or suggested an ink based on oil-in-water microemulsion composition which is thermodynamically stable while in storage (in which the dye in dissolved in the composition) and wherein upon application of the ink to a substrate surface, the microemulsion converted into nanoparticles composed of the dye molecules, which have pigment-like properties. Such a composition will be highly advantageous because of its superior stability during storage and before jetting, will not cause clogging during jetting since no pigments are present prior to jetting and upon conversion of the microemulsion into nanoparticles (pigment) after jetting, good lightfastness and excellent waterfastness will be achieved.

While known compositions and processes are suitable for their intended purposes a need still remains for ink compositions suitable for ink-jet inks compositions for non-thermal, drop on-demand ink-jet applications such as Piezo, which employs piezoelectric element to pressurize and expel ink droplets onto print medium.

In addition there is a need for ink which is thermodynamically stable (as opposed to kinetically stable) while in storage, with "pigment like" properties upon application on substrate surface. Further, a need exists for ink composition which provide non-bleeding ink with fast drying times, improved lightfastness and excellent waterfastness. Additionally, there is a need for ink compositions that does not cause clogging of the print head. There is also a need for ink compositions that can be employed on low energy surfaces.

SUMMARY OF THE INVENTION

The present invention provides an oil-in-water microemulsion ink-jet ink composition including a solubilized hydrophobic dye, which forms nano-particles ("pigment like") upon application on a substrate surface.

In a first embodiment the present invention provides an ink-jet ink composition for piezoelectric ink-jet printing comprising:
  (a) a hydrophobic dye;
  (b) an oil-in-water microemulsion including;
    (i) a volatile oil;
    (ii) water;
    (iii) a co-solvent;
    (iv) at least one surfactant; and
    (v) a binder
  wherein upon application of the ink to a substrate surface, the volatile oil evaporates and nano-particles are formed.

In a preferred embodiment the hydrophobic dye is selected from the group consisting of Solvent Blue 37, Solvent Yellow 2, Solvent Yellow 14, Solvent Yellow 16, (Sudan Yellow 146), Solvent Yellow 21, Solvent Yellow 56 (Sudan Yellow 150), Solvent Yellow 93 (Thermoplast Yellow 104), Solvent Yellow 98, Solvent Yellow 114, Solvent Yellow 163, Solvent Yellow 176, Solvent Red 8 (Valifast Red 3312), Solvent Red 23, Solvent Red 24 (Stenoplast Red G-BN), Solvent Red 25, Solvent Red 41, Solvent Red 49 (Baso Red 546), Solvent Red 52, Solvent Red 111 (Oplas Red 330), Solvent Red 122 (Valifast Red 3311), Solvent Red 132 (Valifast Red 3320), Solvent Red 135 (Oplas Red 339), Solvent Red 149, Solvent Red 168, Solvent Red 169, Solvent Red 196, Solvent Red 197, Solvent Red 207, Solvent Blue 4 (Baso Blue 645), Solvent Blue 5 (Orient Oil Blue 603), Solvent Blue 6, Solvent Blue 28, Solvent Blue 35 (Sudan Blue 670), Solvent Blue 36 (Sonaile Blue FB), Solvent Blue 38 (Neptune 722), Solvent Blue 59, Solvent Blue 60, Solvent Blue 70 (Valifast Blue 2606), Solvent Blue 78 (Elbaplast Blue G), Solvent Blue 122, Solvent Violet 8, (Baso Violet 608), Solvent Violet 9 (Baso Violet 618), Solvent Violet 11, Solvent Violet 13 (Sicostyren Blue 68-405), Solvent Violet 26, Solvent Violet 28, Solvent Violet 31, Solvent Violet 59, Solvent Green 3 (Alizarine Green G Base), Solvent Green 5 (Fluorol Green Gold 804), Solvent Orange 45 (Zapon Yellow 176), Solvent Orange 54 (Valifast Orange Orange 3210), Solvent Orange 60 (Oplas Orange 230), Solvent Orange 62 (Valifast Orange 3209), Solvent Orange 63 (Hostasol Red GG), Solvent Orange 86, Solvent Brown 43 (Navipon Brown 2RL), Solvent Black 27 (Valifast Black 3820), Solvent Black 3 (Sudan Black B), and Solvent Black 34 (Valifast Black 3804) or mixtures thereof.

In a preferred embodiment the hydrophobic dye is present in the ink composition in an amount of from about 0.05% to about 5% by weight.

In a preferred embodiment the volatile oil is selected from the group consisting of organic solvents, hydrocarbons, aromatic compounds, water immiscible glycol ethers or mixtures thereof.

In a preferred embodiment the organic solvents are selected from the group consisting of butyl acetate, toluene or mixtures thereof.

In a preferred embodiment the hydrocarbons are selected from the group consisting of pentane, hexane, heptane, octane, nonane or mixtures thereof.

In a preferred embodiment the aromatic compounds are selected from the group consisting of xylene, naphthalene, phenanthrene, anthracene derivatives thereof or mixtures thereof.

In a preferred embodiment the water immiscible glycol ethers are selected from the group consisting of phenyl ethers.

In a preferred embodiment the volatile oil is present in the ink composition in an amount of from about 0.5% to about 55% by weight.

In a preferred embodiment the water is present in the ink composition in an amount of from about 30% to about 90% by weight.

In a preferred embodiment the co-solvent is selected from the group consisting of short chain alcohols having a carbon chain length up to seven carbon atoms, alkyl glycols, glycol ethers or mixtures thereof.

In a preferred embodiment the short chain alcohols are selected from the group consisting of 1-propanol, 2-propanol, butanol, pentanol, hexanol, derivatives thereof or mixtures thereof.

In a preferred embodiment the alkyl glycols are selected from the group consisting of ethylene glycol, propylene glycol or mixtures thereof.

In a preferred embodiment the glycol ethers are selected from the group consisting of di-propylene glycol mono methyl ether, tri-propylene glycol mono methyl ether, propylene glycol mono n-butyl ether, di-propylene glycol mono n-butyl ether, tri-propylene glycol mono n-butyl ether, propylene glycol mono propyl ether, di-propylene glycol mono propyl ether or mixtures thereof.

In a preferred embodiment the co-solvent is present in the ink composition in an amount of from about 5% to about 60% by weight.

In a preferred embodiment the surfactant is selected from the group consisting of anionic surfactants, nonionic surfactants or mixtures thereof.

In a preferred embodiment the anionic surfactant is selected from the group consisting of mono-alkylated-di-sulfonated di-phenyl oxides, di-alkylated-di-sulfonated diphenyl oxides, sodium dodecyl sulfate or mixtures thereof.

In a preferred embodiment the nonionic surfactant is selected from the group consisting of ethoxylated sorbitan esters, polyoxyethylene alkyl ethers, octylphenoxy polyethoxyethanol or mixtures thereof.

In a preferred embodiment the surfactant is present in the ink composition in an amount of from about 0.1% to about 25% by weight.

In a preferred embodiment the binder is selected from the group consisting of polymers, resin solutions, colloidal solutions, acrylic emulsion polymers or mixtures thereof.

In a preferred embodiment the polymer is polyvinylpyrollidone.

In a preferred embodiment the resin solutions, colloidal solutions and acrylic emulsion polymers are selected from the group consisting of SCX-8085, SCX-8087, SCX-8223, SCX-8004, JC-142, JC-77, JC-95, JC-537, JC-538, JC-586 (provided by S.C. Johnson Polymer Company) or mixtures thereof. See details concerning these materials in the detailed description of the invention part.

In a preferred embodiment the binder is present in the ink composition in an amount of from about 0.01% to about 20% by weight.

The present invention further provides a printing process using the ink composition as defined in the present invention comprising the steps of;
(a) incorporating into an ink jet printer the ink composition according to the invention;
(b) printing the ink composition on a substrate surface by means of a piezoelectric element located within the ink jet, whereupon application of the ink on the substrate surface the volatile oil evaporates and nanoparticles are formed.

DETAILED DESCRIPTION OF THE INVENTION

The present invention relates to an oil-in-water microemulsion ink-jet ink composition including a highly hydrophobic dye, which forms nano-particles ("pigment like") upon application on the substrate surface. The composition features a hydrophobic dye, a volatile oil, water, a co-solvent, at least one surfactant and a binder.

The ink composition of the present invention is thermodynamically stable, environmentally friendly while in storage and provides fast dry times, waterfastness and good line definition upon application on a print media.

The hydrophobic dye is preferably Solvent Blue 37, solvent yellow 2, solvent yellow 14, solvent yellow 16, (Sudan yellow 146), solvent yellow 21, solvent yellow 56 (Sudan yellow 150), solvent yellow 93 (Thernoplast yellow 104), solvent yellow 98, solvent yellow 114, solvent yellow 163, solvent yellow 176, solvent red 8 (Valifast red 3312), solvent red 23, solvent red 24 (Stenoplast red G-BN), solvent red 25, solvent red 41, solvent red 49 (Baso red 546), solvent red 52, solvent red 111 (Oplas red 330), solvent red 122 (Valifast red 3311), solvent red 132 (Valifast red 3320), solvent red 135 (Oplas red 339), solvent red 149, solvent red 168, solvent red 169, solvent red 196, solvent red 197, solvent red 207, solvent blue 4 (Baso blue 645), solvent blue5 (orient oil blue 603), solvent blue 6, solvent blue 28, solvent blue 35 (Sudan blue 670), solvent blue 36 (Sonaile blue FB), solvent blue 38 (Neptune 722), solvent blue 59, solvent blue 60, solvent blue 70 (Valifast blue 2606), solvent blue 78 (Elbaplast blue G), solvent blue 122, solvent violet 8 (Baso violet 608), solvent violet 9 (Baso violet 618), solvent violet 11, solvent violet 13 (Sicostyren Blue 68-405), solvent violet 26, solvent violet 28, solvent violet 31, solvent violet 59, solvent green 3 (Alizarine green G base), solvent green 5 (Fluorol green gold 804), solvent orange 45 (Zapon yellow 176), solvent orange 54 (Valifast orange orange 3210), solvent orange 60 (Oplas orange 230), solvent orange 62 (Valifast orange 3209), solvent orange 63 (Hostasol red GG), solvent orange 86, solvent brown 43 (Navipon brown 2RL), solvent black 3 (Sudan Black B), solvent black 27

(Valifast black 3820) and solvent black 34 (Valifast black 3804) or mixtures thereof, and most preferably solvent blue (sudan blue 679) or solvent black 3 (sudan black B) are used when sec-butyl acetate is used as the oily phase of the microemulsion.

Preferably the hydrophobic dye is present in the ink composition in an amount of from about 0.05% to about 5% by weight and most preferably from about 0.2% to about 2% by weight.

The dye is selected so that it is relatively soluble in the oily phase of the microemulsion and relatively insoluble in water.

The volatile oil of the ink composition constitutes the oil phase of the microemulsion and is immiscible with water. The volatile oil is one in which an hydrophobic dye can be dissolved, and is capable of forming an emulsion in water, preferably an oil-in-water emulsion. The oil provides the discontinuous phase of the emulsion.

The volatile oil is preferably organic solvents, hydrocarbons, aromatic compounds, water immiscible glycol ethers or mixtures thereof, most preferably organic solvents such as butyl acetate, toluene or mixtures thereof.

The hydrocarbons are preferably pentane, hexane, heptane, octane, nonane or mixtures thereof.

The aromatic compounds are preferably xylene, naphthalene, phenanthrene, anthracene, derivatives thereof or mixtures thereof.

The water immiscible glycol ethers are preferably phenyl ethers.

Preferably the volatile oil is present in the ink composition in an amount of from about 0.5% to about 55% by weight and most preferably from about 5% to about 20% by weight.

The function of water is to provide a continuous phase for the microemulsion droplets. Water is present in the ink in any effective amount to enable formation of an emulsion, preferably an oil in water emulsion.

Preferably the water is present in the ink composition in an amount of from about 30% to about 90% by weight and most preferably of from about 35% to about 70% by weight.

Co-solvents which are used in the ink composition refer to a water-miscible solvent having a vapor pressure lower than that of water. Co-solvents are added to reduce the surface tension of water and to stabilize microemulsion droplets.

The co-solvents are preferably short chain alcohols having a carbon chain length up to seven carbon atoms, alkyl glycols, glycol ethers or mixtures thereof. Most preferably a mixture of co-solvents are used in order to control ink properties.

Preferably the short chain alcohols are selected from the group consisting of 1-propanol, 2-propanol, butanol, pentanol, hexanol, derivatives thereof or mixtures thereof.

Preferably the alkyl glycols are selected from the group consisting of ethylene glycol, propylene glycol or mixtures thereof.

Preferably the glycol ethers are selected from the group consisting of di-propylene glycol mono methyl ether, tripropylene glycol mono methyl ether, propylene glycol mono n-butyl ether, di-propylene glycol mono n-butyl ether, tripropylene glycol mono n-butyl ether, propylene glycol mono propyl ether, di-propylene glycol mono propyl ether or mixtures thereof.

Preferably the co-solvent is present in the ink composition in an amount of from about 5% to about 60% by weight and most preferably from about 5% to about 25% by weight.

Surfactants are added to the composition in order to stabilize the microemulsion and to prevent the coalescence of the drops. The surfactants reduce the surface tension and form a stable, coherent interfacial film.

The surfactants are preferably anionic surfactants, nonionic surfactants or mixtures thereof, most preferably anionic surfactants.

In a preferred embodiment the anionic surfactant is selected from the group consisting of mono-alkylated-di-sulfonated di-phenyl oxides, di-alkylated-di-sulfonated diphenyl oxides, sodium dodecyl sulfate or mixtures thereof, most preferably mono-alkylated-di-sulfonated di-phenyl oxides (DOWFAX family surfactants from DOW chemicals Co.) with the general formula:

or di-alkylated-di-sulfonated diphenyl oxides with the general formula:

In a preferred embodiment the nonionic surfactant is selected from the group consisting of ethoxylated sorbitan esters, polyoxyethylene alkyl ethers, octylphenoxy polyethoxyethanol (octoexanol) surfactants with the general formula $(CH_3)_3C—CH_2—C—(CH_3)_2-\Phi-(O—CH_2—CH_2)x-OH$, where $\Phi$=phenyl and x=8–22 ethoxy units, or mixtures thereof.

The selection of the surfactant depends on the required HLB (hydrophilic-lypophylic balance) of the inner emulsified oily phase.

Preferably the surfactant is present in an amount effective to stabilize the emulsion formed from the hydrophobic oil phase and hydrophilic aqueous phase.

Preferably the surfactant is present in the ink composition in an amount of from about 0.1% to about 25% by weight and most preferably from about 2% to about 20% by weight.

The binders are preferably polymers, resin solutions, colloidal solutions, acrylic emulsion polymers, or mixtures thereof.

The polymer is preferably polyvinylpyrollidone.

The resin solutions, colloidal solutions or acrylic emulsion polymers are preferably SCX-8085, SCX-8087, SCX-8223, SCX-8004, JC-142, JC-77, JC-95, JC-537, JC-538, JC-586 (provided by Johnson Polymer Company).

SCX-8004 is a partially neutralized colloidal solution polymer with 32.5% solids by weight.

SCX-8085 is a ready made 43% solids solution of Johncryl 682 solid acrylic oligomer with 13% ammonia (25%).

SCX-8087 is a ready made 50% solids solution of Johncryl 682 solid acrylic oligomer with 15% ammonia (25%) and 5% Iso Propyl Alcohol.

SCX-8223 is an acrylic copolymer emulsion with 30% solids by weight.

JC-77 is an acrylic polymer emulsion with 46% solids by weight.

JC-95 is a fine particle size acrylic colloidal dispersion with 30% solids by weight.

JC-142 is a partially neutralized acrylic polymer emulsion with 40% solids by weight.

JC-537 is an acrylic polymer emulsion with 48% solids by weight.

JC-538 is an acrylic polymer emulsion with 45% solids by weight.

JC-586 is an acid functional acrylic resin with 97% solids by weight.

Preferably the binder is present in the ink composition in an amount of from about 0.01% to about 20% by weight and most preferably from about 0.1% to about 15% by weight.

In case an acrylic polymer is used, the ink composition must attain a basic pH while in storage in order to keep the binder in solution.

Amines are added in order to solubilize the resin system in solution and evaporate quickly to allow the ink to dry after impacting the print media. Suitable amines must be characterized differently for each formulation.

Consistent with the requirements of this invention, various types of additives may be employed in the ink to optimize the properties of the ink composition for specific applications. For example, as is well known to those skilled in the art, one or more biocides, fungicides and antimicrobial agents may be used in the ink composition as is commonly practiced in the art. Additionally, chelating agents such as EDTA, may be included to eliminate deleterious effects of heavy metal impurities. Buffer solutions may be used to control the pH of the ink. Wetting agents may be added to enhance the wetting of the ink on the substrate (paper, plastic etc.). They usually function through reduction of surface tension of the liquid (ink), or by adsorption on the substrate. Mostly used wetting agents are surfactants. Other known additives such as viscosity modifiers may be added to improve various properties of the ink compositions as desired.

For a better understanding of the object of the invention, several examples of this composition are described; these are intended as purely illustrative examples without any intention of being limiting. It is to be understood that the invention is not limited in its application to the details of construction and the arrangement of the components set forth in the following description. The invention includes other embodiments and can be practiced or implemented in various ways. It is also to be understood that the phraseology and terminology employed herein is for the purpose of description only and should not be regarded as limiting.

EXAMPLES OF FORMULATIONS OF THE PRESENT INVENTION

Example 1

A typical ink composition was prepared from the following materials:

| Quantity (% by weight) | Ingredient |
| --- | --- |
| 10% | C12-MADS [a] |
| 15% | 1-Propanol |
| 9.5% | sec-Butyl Acetate |
| 4% | Tri-Propylene glycol methyl ether |
| 3% | Ammonia |
| 2% | JC-537 |
| 0.5% | Solvent Blue 35 |
| 0.3% | BYK-346 [b] |
| 55.7% | Water |

[a] C12-MADS is dodecyl disulphonated diphenyl oxide
[b] BYK-346 is a polymeric surfactant from BYK company The Ink of example 1 was prepared by dissolving the hydrophobic dye first in sec-butyl acetate. Next, surfactant, co-solvent, ammonia and water were mixed together with the latex (binder) and agitated for 10 minutes. Then water and oil mixtures were added to form a stable oil-in-water microemulsion with the hydrophobic dye dissolved within the oil droplet. The mixture was then shaken and stirred for additional 10 min.

Ink formulated with the foregoing composition was applied on a vinyl substrate and a continuous film was formed with good wetting.

Example 2

| Quantity (% by weight) | Ingredient |
| --- | --- |
| 20% | Dowfax* dry detergent powder |
| 10% | 1-Pentanol |
| 9.5% | Toluene |
| 0.5% | SCX-8223 |
| 0.5% | Solvent Blue 37 |
| 59.5% | water |

The Ink of example 2 was prepared by combining first the oil and cosolvent, next the hydrophobic dye was added to the oil:co-solvent solution to form a mixture. The mixture was then shaken and stirred for 10 min. Surfactant dissolved in water and mixed with solvent latex (binder) was then added to form a stable oil-in-water microemulsion with the hydrophobic dye dissolved within the oil droplet.

Ink of this example was printed successfully on Ink-Jet paper from a drop on-demand printer with Piezo head (Epson, Stylus 440 Ink-Jet printer). The ink formulated with the foregoing composition exhibited waterfastness, fast drying times and high print quality.

The ink formulated with the foregoing composition exhibited excellent waterfastness, fast drying times and high print quality when printed on Ink-Jet paper and on an Ink-Jet transparency, from a drop on-demand printer with Piezo head (Epson, Stylus 440 Ink-Jet printer).

Example 3

| Quantity (% by weight) | Ingredient |
| --- | --- |
| 10% | Sodium dodecyl sulfate |
| 12% | 1-Pentanol |
| 34% | sec-Butyl Acetate |
| 4% | Tri-Propylene glycol methyl ether |
| 3% | SCX-8223 |
| 0.5% | Solvent Blue 35 |
| 0.5% | BYK-346 |
| 36% | Water |

The Ink of example 3 was prepared by combining first the oil and co-solvent, next the hydrophobic dye was added to the oil:co-solvent solution to form a mixture. The mixture was then shaked and stirred for 10 min. The surfactant dissolved in water was mixed with the solution polymer and then added to the oil:col-solvent mixture to form a stable oil-in-water microemulsion with the hydrophobic dye dissolved within the oil droplet. The wetting agent was finally added to the ink formulation.

Ink formulated with the foregoing composition exhibited excellent waterfastness, fast drying times and high print quality when printed on Ink-Jet paper and on an Ink-Jet transparency, from a drop on-demand printer with Piezo head (Epson, Stylus 440 Ink-Jet printer).

Example 4

| Quantity (% by weight) | Ingredient |
| --- | --- |
| 10% | C10-DADS [a] |
| 24% | 1-Propanol |
| 9% | sec-Butyl Acetate |
| 3% | Ammonia |
| 2% | JC-537 |
| 0.5% | Solvent Blue 35 |
| 0.5% | BYK-346 |
| 51% | Water |

[a] C10-DADS is didecyl disulphonated diphenyl oxide

The Ink of example 4 was prepared by dissolving the hydrophobic dye first in sec-butyl acetate. Next surfactant, co-solvent, ammonia and water were mixed together with the latex (binder) and agitated for 10 minutes. Then water and oil mixtures were added to form a stable oil-in-water microemulsion with the hydrophobic dye dissolved within the oil droplet. The mixture was then shaked and stirred for additional 10 min.

The ink formulated with the foregoing composition was applied on a vinyl substrate and a continuous film was formed with good wetting.

Example 5

| Quantity (% by weight) | Ingredient |
| --- | --- |
| 19% | Tween 80 |
| 19% | propylene Glycol |
| 9% | sec-Butyl Acetate |
| 0.5% | Sudan Black |
| 0.5% | SCX-8223 |
| 0.5% | BYK-346 |
| 51.5% | Water |

The Ink of example 5 was prepared by dissolving the hydrophobic dye first in sec-butyl acetate. Next, surfactant, co-solvent, solvent latex (binder) and water were mixed together and agitated for 10 minutes. The two mixtures were combined and stirred for 30 min.

Ink formulated with the foregoing composition was applied on a vinyl substrate and a continuous film was formed with good wetting.

DETAILED DESCRIPTION OF FIGURE

Figure 1:
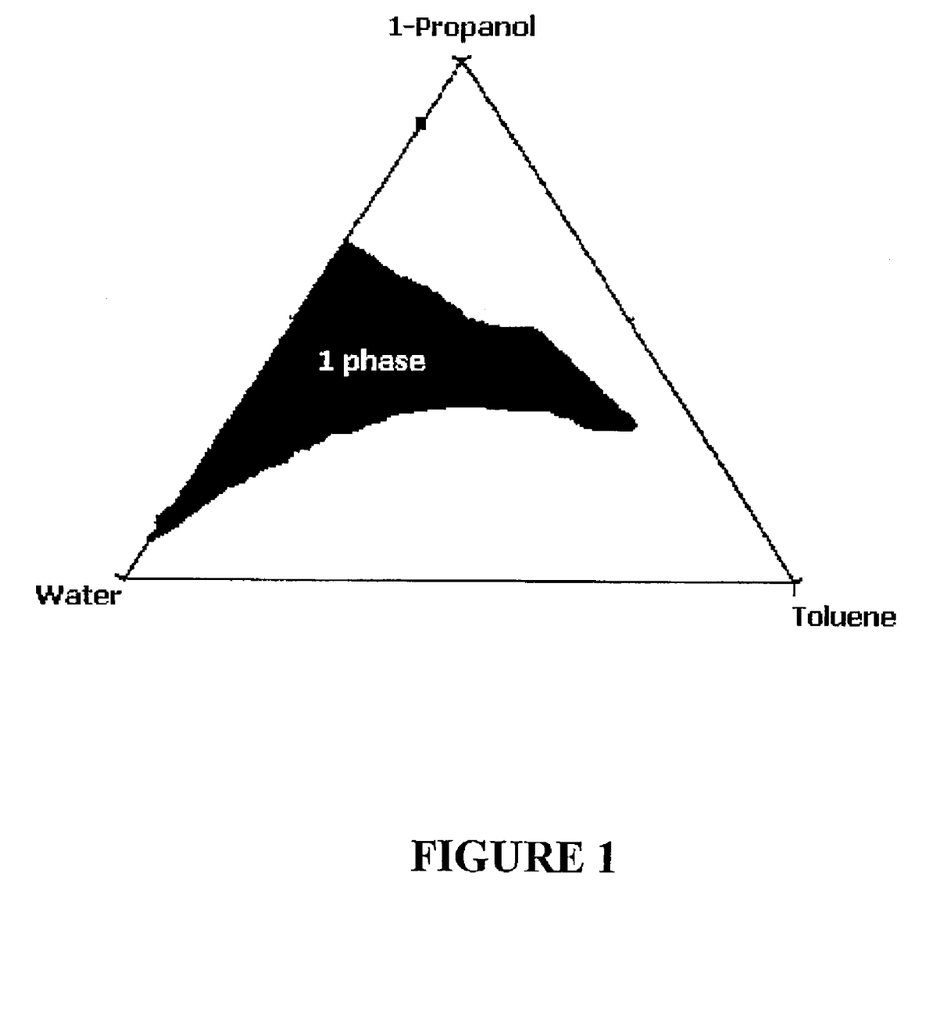
FIG. 1—Toluene-1-propanol-water Phase diagram with 10% Dowfax dry detergent

Illustrated schematically in FIGURE 1 is a phase diagram at 25° C. for mixtures of water, 1-Propanol, Toluene with constant 10% of Dowfax* dry detergent powder. This FIGURE illustrates the microemulsion region of one of the systems used in the formulations.

It will be appreciated that the above descriptions are intended only to serve as examples, and that many other embodiments are possible within the spirit and the scope of the present invention.

What is claimed is:

1. An ink-jet composition for piezoelectric ink-jet printing comprising:
   (a) a thermodynamically stable oil-in-water microemulsion including:
      (i) a volatile oil;
      (ii) water;
      (iii) a co-solvent;
      (iv) at least one surfactant;
      (v) a binder; and
   (b) a hydrophobic dye dissolved in oil droplets of the composition;
   wherein the hydrophobic dye is present only in the oil droplets of the composition;
   wherein the oil droplets consist essentially of the volatile oil and the dye; and
   wherein upon application of the ink to a substrate surface, the volatile oil evaporates and nanoparticles composed of the dye molecules are formed.

2. The ink composition of claim 1, wherein the hydrophobic dye is selected from the group consisting of Solvent Blue 37, Solvent Yellow 2, Solvent Yellow 14, Solvent Yellow 16, Solvent Yellow 21, Solvent Yellow 56, Solvent Yellow 93, Solvent Yellow 98, Solvent Yellow 114. Solvent Yellow 163, Solvent Yellow 176, Solvent Red 8, Solvent Red 23, Solvent Red 24 Solvent 25, Solvent Red 41, Solvent Red 49, Solvent Red 52, Solvent Red 111, Solvent 122, Solvent Red 132, Solvent Red 135, Solvent Red 149, Solvent Red, 168, Solvent Red 169, Solvent Red 196, Solvent Red 197, Solvent Red 207, Solvent Blue 4, Solvent Blue 5, Solvent Blue 6, Solvent Blue 28, Solvent Blue 35, Solvent Blue 36, Solvent Blue 38, Solvent Blue 59, Solvent Blue 60, Solvent Blue 70, Solvent Blue 78, Solvent Blue 122, Solvent Violet 8, Violet 9; Solvent Violet 11, Solvent Violet 13, Solvent Violet 26, Solvent Violet 28, Solvent Violet 31, Solvent Violet 59, Solvent Green 3, Solvent Green 5, Solvent Orange 45, Solvent Orange 54, Solvent Orange 60, Solvent Orange 62, Solvent Orange 63, Solvent Orange 86, Solvent Brown 43, Solvent Black 27, Solvent Black 3, and Solvent Black 34 or mixtures thereof.

3. The ink composition of claim 1, wherein the hydrophobic dye is present in said ink composition in an amount of from about 0.05% to about 5% by weight.

4. The ink composition of claim 1, wherein the volatile oil is selected from the group consisting of organic solvents, hydrocarbons, aromatic compounds and mixtures thereof.

5. The ink composition of claim 4, wherein the volatile oil is organic solvents which are selected from the group consisting of butyl acetate, toluene and mixtures thereof.

6. The ink composition of claim 4, wherein the volatile oil is hydrocarbons which are selected from the group consisting of pentane, hexane, heptane, octane, nonane, and mixtures thereof.

7. The ink composition of claim 4, wherein the volatile oil is an aromatic compound.

8. The ink composition of claim 1, wherein the volatile oil is present in said ink composition in an amount of from abut 0.5% to about 55% by weight.

9. The ink composition of claim 1, wherein the water is present in said ink composition in an amount of from about 30% to about 90% by weight.

10. The ink composition of claim 1, wherein the co-solvent is selected from the group consisting of alcohols having a carbon chain length of up to seven carbon atoms, alkyl glycols, glycol ethers, and mixtures thereof.

11. The ink composition of claim 10, wherein the alcohols are selected from the group consisting of 1-propanol, 2-propanol, butanol, pentanol, hexanol, and mixtures thereof.

12. The ink composition of claim 10, wherein the alkyl glycols are selected from the group consisting of ethylene glycol, propylene glycol, and mixtures thereof.

13. The ink composition claim 10, wherein the glycol ethers are selected from the group consisting of di-propylene glycol mono methyl ether, tri-propylene glycol mono methyl ether, propylene glycol mono n-butyl ether, di-propylene glycol mono n-butyl ether, tri-propylene glycol mono n-butyl ether, propylene glycol mono propyl ether, di-propylene glycol mono propyl ether, and mixtures thereof.

14. The ink composition of claim 1, wherein the co-solvent is present in said ink composition in amount of from about 5% to about 60% by weight.

15. The ink composition of claim 1, wherein the surfactant is selected from the group consisting or anionic surfactants, nonionic surfactants and mixtures thereof.

16. The ink composition of claim 15, wherein the anionic surfactant is selected from the group consisting of mono-alkylated-di-sulfonated di-phenyl oxides, di-alkylated-di-sulfonated di-phenyl oxides, sodium dodecyl sulfate, and mixtures thereof.

17. The ink composition of claim 6, wherein the nonionic surfactant is selected from the group consisting of ethoxylated sorbitan esters, polyoxyethylene alkyl ethers, octylphenoxy polyethoxyethanol, and mixtures thereof.

18. The ink composition of claim 1, wherein the surfactant is present in said ink composition in an amount of from about 0.1% to about 25% by weight.

19. The ink composition of claim 1, wherein the binder is selected from the group consisting of polymers, resin solutions, colloidal solutions, acrylic emulsion polymers, and mixtures thereof.

20. The ink composition of claim 19, wherein the polymer is polyvinylpyrrolidone.

21. The ink composition of claim 19, wherein the resin solutions, colloidal solutions and acrylic emulsion polymers are selected from the group consisting of SCX-8085, SCX-8087, SCX-8223, SCX-8004, JC-142, JC-77, JC-95, JC-537, JC-538, JC-586 and mixtures thereof.

22. The ink composition of claim 1, wherein the binder is present in said ink composition in an amount of from about 0.01% to about 20% by weight.

23. A printing process comprising the steps of:
(a) incorporating into the ink jet printer the ink composition of claim 1, and
(b) printing said ink composition on a substrate surface by means of a piezoelectric element located within the ink jet, whereupon application of the ink on the substrate surface the volatile oil evaporates and nanoparticles are formed.

24. A printing process which comprises printing on a substrate surface with an ink jet composition, which comprises:
(a) a thermodynamically stable oil-in-water microemulsion including:
(i) a volatile oil;
(ii) water;
(iii) a co-solvent;
(iv) at least one surfactant; and
(v) a binder; and
(b) a hydrophobic dye dissolved in the oily phase of the emulsion;
wherein the hydrophobic dye is present only in the oil droplets of the composition;
wherein the oil droplets consist essentially of the volatile oil and the dye; and
wherein upon application of the ink to a substrate surface, the volatile oil evaporates and nanoparticles composed of the dye molecules are formed.

25. The ink composition of claim 7, wherein the aromatic compound is xylene.

* * * * *

UNITED STATES PATENT AND TRADEMARK OFFICE
CERTIFICATE OF CORRECTION

| | | |
|---|---|---|
| PATENT NO. | : 7,115,161 B2 | Page 1 of 1 |
| APPLICATION NO. | : 10/276424 | |
| DATED | : October 3, 2006 | |
| INVENTOR(S) | : Magdassi et al. | |

It is certified that error appears in the above-identified patent and that said Letters Patent is hereby corrected as shown below:

1) On the Title page, section 22, the PCT filing date should read --May 14, 2001--.

Signed and Sealed this

Twenty-seventh Day of March, 2007

JON W. DUDAS
*Director of the United States Patent and Trademark Office*